(12) United States Patent
Zhang et al.

(10) Patent No.: US 12,480,854 B1
(45) Date of Patent: Nov. 25, 2025

(54) DEVICE AND METHOD FOR DETERMINING GAS DIFFUSION COEFFICIENT IN ROCKS

(71) Applicant: Southwest Petroleum University, Chengdu (CN)

(72) Inventors: Ruihan Zhang, Chengdu (CN); Feng Ge, Chengdu (CN); Jianfa Wu, Chengdu (CN); Jian Zheng, Chengdu (CN); Hongxi Li, Chengdu (CN); Qian Li, Chengdu (CN); Yulong Zhao, Chengdu (CN); Tao Zhang, Chengdu (CN); Bo Hu, Chengdu (CN); Liehui Zhang, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 19/227,295

(22) Filed: Jun. 3, 2025

(30) Foreign Application Priority Data

Mar. 20, 2025 (CN) .......................... 202510329263.5

(51) Int. Cl.
*G01N 7/10* (2006.01)
*G01N 33/24* (2006.01)

(52) U.S. Cl.
CPC .............. *G01N 7/10* (2013.01); *G01N 33/24* (2013.01)

(58) Field of Classification Search
CPC .................................. G01N 7/10; G01N 33/24
See application file for complete search history.

(56) References Cited

U.S. PATENT DOCUMENTS

2015/0369718 A1* 12/2015 Chertov ............... G01N 15/082
 73/38
2024/0393224 A1* 11/2024 Feng ...................... G01N 33/24

FOREIGN PATENT DOCUMENTS

| AT | 526617 A1 * | 5/2024 | ........ G01N 15/0806 |
| CN | 205138955 U | 4/2016 | |
| CN | 106353223 A * | 1/2017 | |

(Continued)

OTHER PUBLICATIONS

Zhao Yulong et al., Research Progress on Reservoir Characteristics and Seepage Characteristics of Deep and Ultra-Deep Carbonate Oil and Gas Reservoirs, Journal of Liaoning Shihua University, Oct. 15, 2024 (Oct. 15, 2024), pp. 44053.

(Continued)

*Primary Examiner* — Fatemeh Esfandiari Nia
(74) *Attorney, Agent, or Firm* — Birchwood IP

(57) ABSTRACT

Disclosed are a device and method for determining gas diffusion coefficient in rocks. The device includes: a core holder, a sampling mechanism, a gas analyzer, a gas source and a pressure gauge. A middle part of the core holder holds a rock sample, two sampling mechanisms are symmetrically arranged at two ends of the rock sample, each sampling mechanism includes a first blind tube, a cylinder, a second blind tube and a sampling cavity, an open end of the first blind tube faces the rock sample and is in sealing connection with an end surface of the rock sample to form a diffusion chamber. A single sampling cavity is isolated from the diffusion chamber, and the pressure of the diffusion chamber is not affected, so that undisturbed sampling is achieved, the influence on the pressure of the diffusion chamber is reduced, and the accuracy of the determination results is improved.

9 Claims, 5 Drawing Sheets

(56) References Cited

FOREIGN PATENT DOCUMENTS

| | | | | |
|---|---|---|---|---|
| CN | 108444869 B | | 8/2018 | |
| CN | 111077044 A | | 4/2020 | |
| CN | 111521685 A | * | 8/2020 | ............ G01N 33/24 |
| CN | 118376559 A | * | 7/2024 | ............ G01N 13/04 |
| JP | 2001116676 A | | 4/2001 | |
| JP | 2003042925 B2 | | 2/2003 | |

OTHER PUBLICATIONS

Li Bing, Experimental and Theoretical Study onPhysical Simulation of Diffusion of Methane in Coal, Engineering Science and Technology I series of Chinese Doctoral Dissertation Full-text Database, Mar. 15, 2017 (Mar. 15, 2017), pp. 77-85.

David A.Wark Wait, I nterdiffusion of H2O and CO2 in metamorphic fluids at 490 to690°C. and 1 GPa, Geochimica et Cosmo chimica Acta, Jun. 4, 2004( Jun. 4, 2004), pp. 2693-2698.

Hong Li et al., An integrated drilling, protection and sealing technology for improving the gas drainage effect in soft coal seams, Energy Reports, Aug. 10, 2020 (Aug. 10, 2020), pp. 2030-2204.

* cited by examiner

DEVICE AND METHOD FOR DETERMINING GAS DIFFUSION COEFFICIENT IN ROCKS

CROSS-REFERENCE TO RELATED APPLICATIONS

This application claims priority to Chinese Patent Application No. 202510329263.5, filed on Mar. 20, 2025, which is hereby incorporated by reference in its entirety.

TECHNICAL FIELD

The present invention relates to the technical field of rock performance determination, and particularly to a device and method for determining gas diffusion coefficient in rocks.

BACKGROUND

The gas diffusion coefficient in rocks not only reveals the diffusion behavior of gas in the reservoir, but also provides critical kinetic characteristic data for multi-component gas systems in engineering applications such as gas injection enhanced recovery, carbon dioxide geological sequestration, well soaking, and multi-cycle injection/production in gas storage reservoirs. Therefore, the gas diffusion coefficient serves as a critical parameter for studying gas migration patterns, optimizing injection-production strategies, and evaluating reservoir performance.

The determination of gas diffusion coefficient in rocks is currently predominately performed using unsteady-state methods. The standard testing method is specified in SY/T6129-2016 "Determination Method for Diffusion Coefficient of Hydrocarbon Gas in Rocks". The method includes: placing a core sample in the middle of a core holder, introducing different gases into diffusion chambers at two ends of the rock sample, and obtaining the diffusion coefficient of hydrocarbon gas in the rock by testing the composition of hydrocarbon gas in the two diffusion chambers at different time points. At least two samplings are required during the test process. Each sampling requires extracting part of the gas from the diffusion chamber for detection, which disturbs the pressure in the diffusion chamber and forms a sudden change in pressure difference between the two diffusion chambers, causing abnormal fluctuations in the diffusion rate of gas molecules, thus resulting in poor repeatability of experimental data and increased errors.

SUMMARY

In view of the above technical problems, an objective of the present invention is to provide a device and a method for determining gas diffusion coefficient in rocks, which can reduce or even eliminate the disturbance of the gas pressure in the diffusion chamber during the sampling process, thereby improving the accuracy of the measurement results.

To achieve the above objective, the present invention provides the following technical solutions.

A device for determining gas diffusion coefficient in rocks includes:
- a core holder for holding a rock sample in a middle;
- two sampling mechanisms respectively arranged at two ends of the rock sample, including:
  - a first blind tube having an open end facing the rock sample and in sealing connection with an end surface of the rock sample to form a diffusion chamber;
  - at least two closed sampling cavities;
  - a cylinder having one end sequentially passing through the sampling cavities and extending into the diffusion chamber, wherein a cylinder wall of the cylinder is provided with a communication hole corresponding to each of the sampling cavities;
  - a second blind tube coaxially sleeved in the cylinder and spaced a certain distance from the cylinder, wherein the second blind tube has a closed end facing the diffusion chamber and an open end in rotary sealing connection with the cylinder, so that an annular cavity communicated with the diffusion chamber is formed between the cylinder and the second blind tube; an outer wall of the second blind tube is provided with an open-loop sealing strip corresponding to the communication hole and a sampling hole passing through a tube wall and the sealing strip; when the second blind tube rotates relative to the cylinder, the communication hole is sequentially switched in the order of diffusion state, sampling state and isolation state, wherein the diffusion state refers to a state where the communication hole faces an opening of the sealing strip, the sampling state refers to a state where the communication hole is communicated with the sampling hole, and the isolation state refers to a state where the communication hole faces an outer wall of the sealing strip and is closed; the sampling holes are staggered along a circumference, so that the communication holes are sequentially communicated with the corresponding sampling holes when the second blind tube is rotated for sampling;
- a gas analyzer communicated with the open end of the second blind tube;
- a gas source communicated with the diffusion chamber; and
- a pressure gauge used to determine a pressure in the diffusion chamber.

In a specific implementation of the present invention, the device further includes a vacuum pump for evacuating the diffusion chamber and the sampling cavities.

In a specific implementation of the present invention, the device further includes a differential pressure gauge for measuring a pressure difference between two diffusion chambers.

In a specific implementation of the present invention, the gas source is communicated with the sampling cavity.

In a specific implementation of the present invention, an outer wall of the sealing strip is provided with an elastic layer to enhance sealing performance, and the sampling hole passes through the elastic layer.

In a specific implementation of the present invention, temperature controllers are provided at two sides of the core holder to independently control temperatures of two diffusion chambers.

In a specific implementation of the present invention, a plurality of gas source are provided, the plurality of gas sources are connected in parallel and then communicated with two intermediate containers, the two intermediate containers are communicated with the two diffusion chambers, each intermediate container is provided with a piston, and a displacement pump is communicated with the two intermediate containers and is used to push the pistons to move in the intermediate containers so as to send gas into the diffusion chambers.

The present invention further discloses a method for determining gas diffusion coefficient in rocks, which uses the determination device to perform measurement, and includes the following steps:

S1. adjusting the communication holes to face an opening of the sealing strip by a connecting device, and then performing airtightness and replacement;

S2. filling target gas into the sampling cavities and the diffusion chambers, and cutting off the gas source after adjusting pressures of the two diffusion chambers to be equal; and S3. starting testing, rotating the second blind tube after a certain time interval to separate a single sampling cavity from the diffusion chamber, then sampling and analyzing gas components, and further calculating diffusion coefficient of the gas.

The beneficial effects of the present invention are as follows:

According to the device for determining gas diffusion coefficient in rocks provided in the present invention, a single sampling cavity is isolated from the diffusion chamber, and the pressure of the diffusion chamber is not affected during the isolation process, so that undisturbed sampling may be achieved, the influence on the pressure of the diffusion chamber is reduced, and the accuracy of the determination results is improved.

REFERENCE NUMERALS

100: core holder; 200: rock sample; 400: gas source; 600: vacuum pump; 700: intermediate container; 800: displacement pump; 900: hollow plug;

310: gas analyzer; 320: pressure gauge; 330: differential pressure gauge; 510: first blind tube; 520: cylinder; 530: second blind tube; 540: diffusion chamber; 550: sampling cavity;

501: communication hole; 502: annular cavity; 503: sealing strip; 504: sampling hole; and 505: gas inlet hole.

DESCRIPTION OF EMBODIMENTS

The present invention is further described below in conjunction with the accompanying drawings and specific implementations. It should be noted that, under the premise of no conflict, any combination between the embodiments or technical features described below may form a new embodiment.

Figure 1:
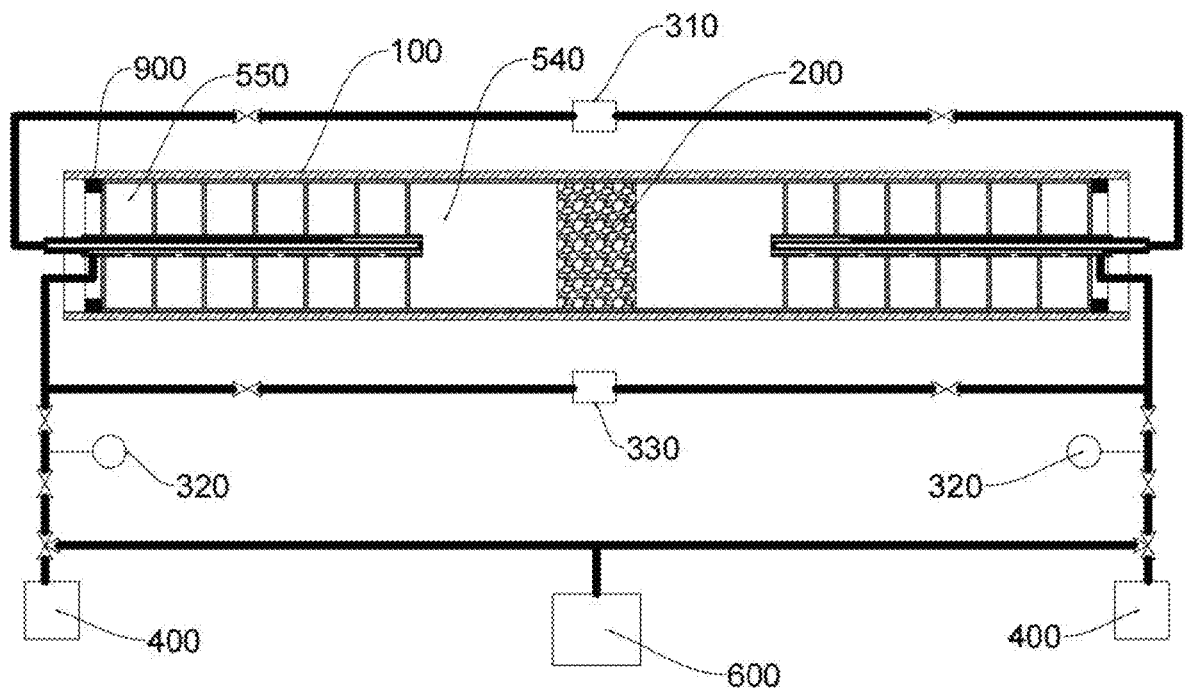
FIG. 1 is a schematic diagram of an overall structure of an embodiment of the present invention.
Figure 2:
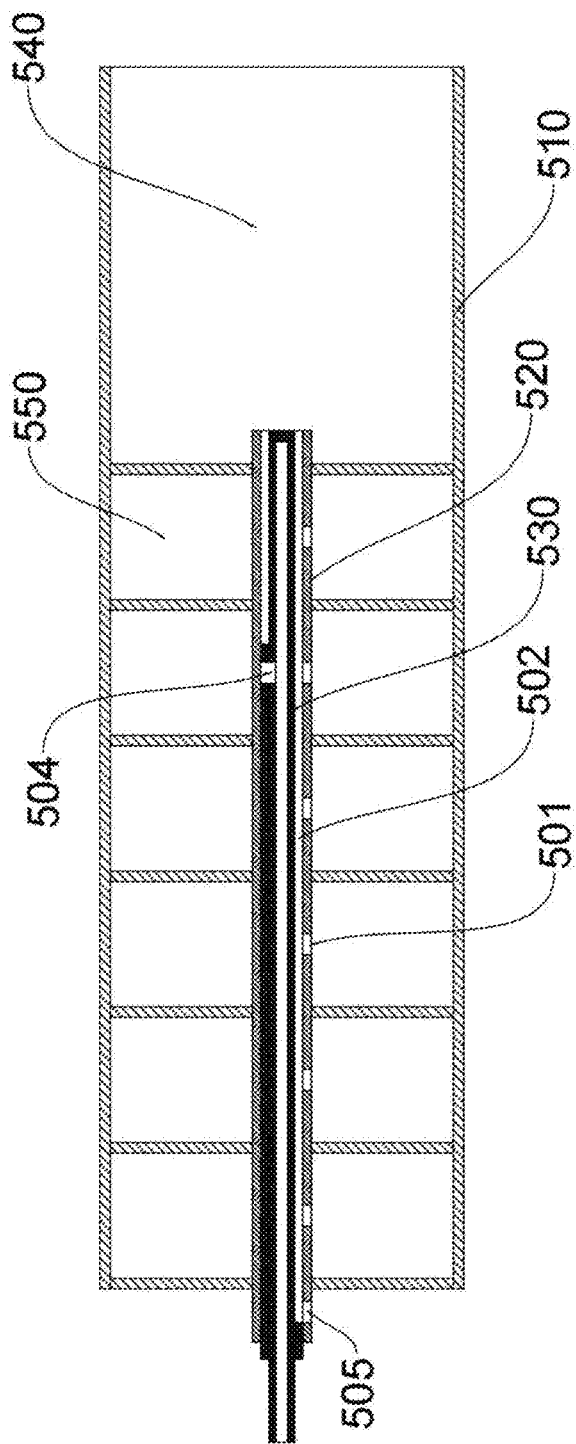
FIG. 2 is a schematic diagram of an overall structure of a sampling mechanism in FIG. 1.
Figure 3:
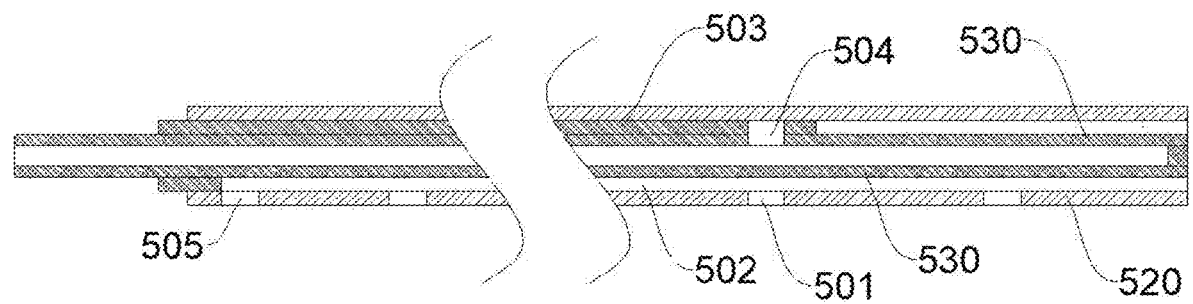
FIG. 3 is a cross-sectional view of a combined structure of a cylinder and a second blind tube in FIG. 2.
Figure 4:
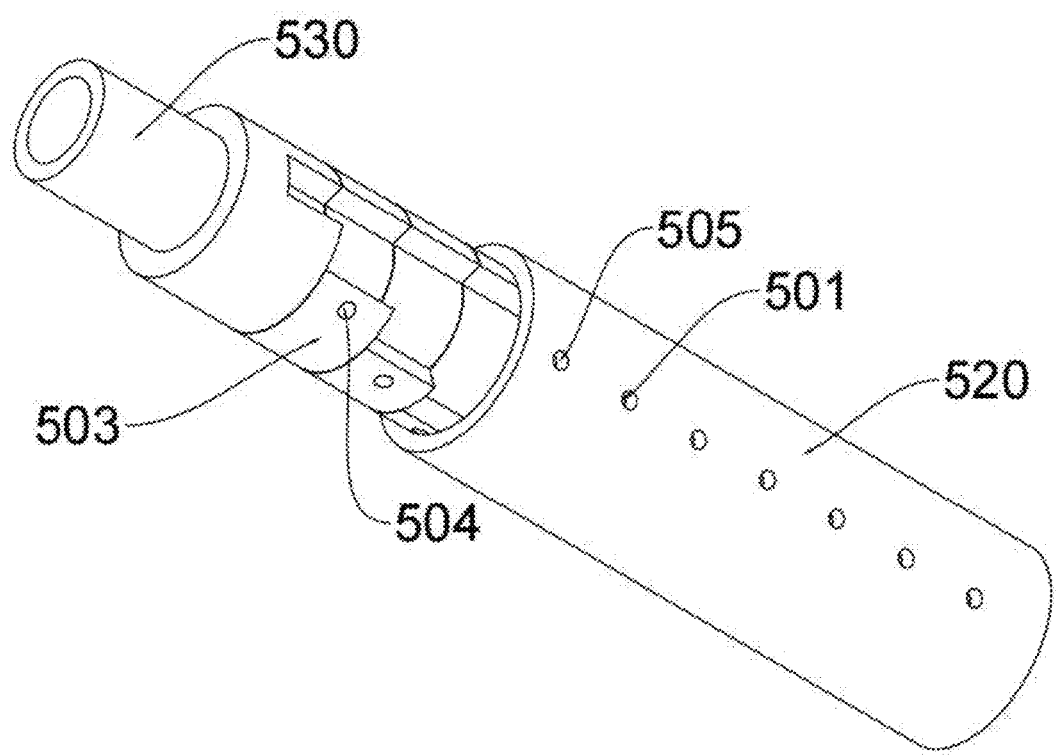
FIG. 4 is an assembling view of a combined structure of a cylinder and a second blind tube in FIG. 2.
Figure 5:
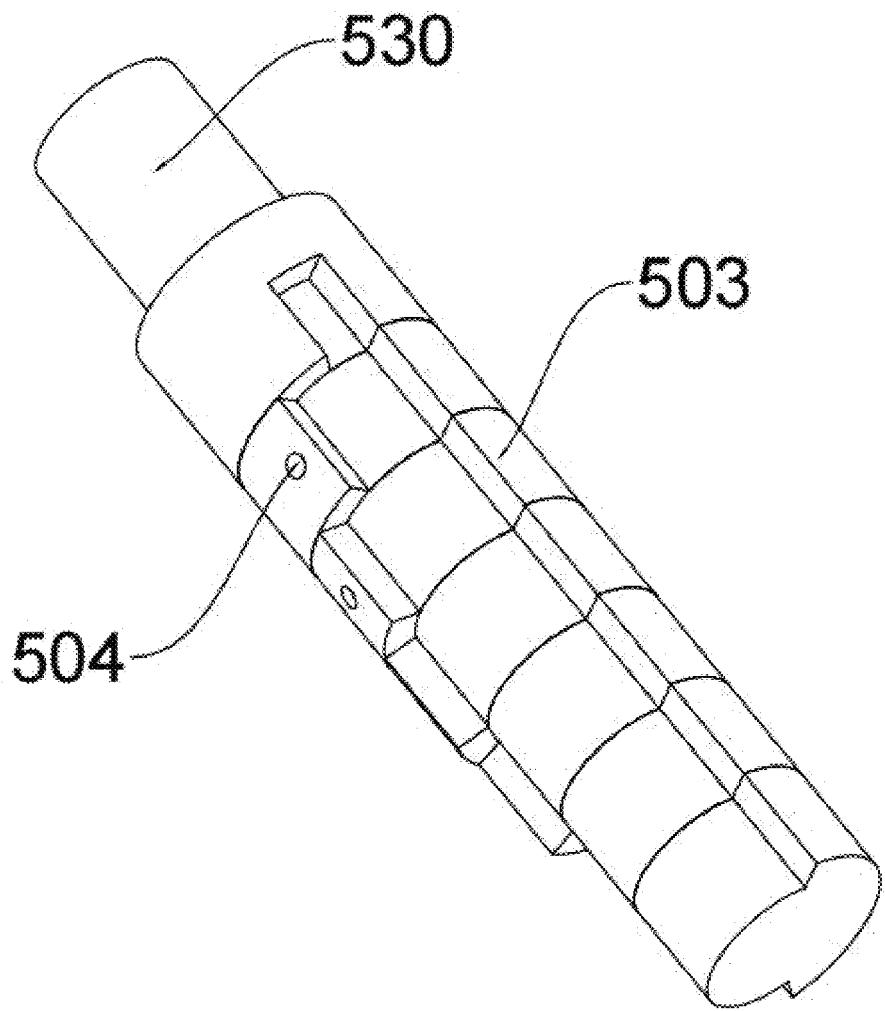
FIG. 5 is a perspective view of a second blind tube in FIG. 4.

Referring to FIGS. 1 to 6, which show schematic structural diagrams of two specific implementations of the device for determining gas diffusion coefficient in rocks provided in the present invention. The device for determining gas diffusion coefficient in rocks provided in the present invention includes a core holder 100, a sampling mechanism, a gas analyzer 310, a gas source 400 and a pressure gauge 320, wherein a middle part of the core holder 100 is used to hold a rock sample 200, two sampling mechanisms are provided and symmetrically arranged at two ends of the rock sample 200, each sampling mechanism includes a first blind tube 510, a cylinder 520, a second blind tube 530 and a sampling cavity 550, an open end of the first blind tube 510 faces the rock sample 200 and is in sealing connection with an end surface of the rock sample 200 to form a diffusion chamber 540. In some embodiments, an inner wall (rubber cylinder) of the core holder 100 may be tightly pressed against an outer wall of the open end of the first blind tube 510 by controlling an annular pressure of the core holder 100, so that sealing is achieved. At least two sampling cavities 550 are provided, and the specific number of the sampling cavities 550 may be designed according to the sampling times in the experimental process, each sampling cavity 550 corresponds to one undisturbed sampling process, and the number of the sampling cavities 550 may be increased to perform undisturbed sampling more times. The sampling cavities 550 are arranged along an axial direction of the core holder 100, and the sampling cavities 550 may be spaced apart at a certain distance, or, as shown in FIG. 2, the sampling cavities 550 may be connected in series in an abutting manner, which may reduce the number of partitions of the sampling cavities 550 and is advantageous for reducing the manufacturing cost. One end of the cylinder 520 passes through the sampling cavities 550 in sequence and extends into the diffusion chamber 540, and a communication hole 501 is formed in a cylinder wall of the cylinder corresponding to each sampling cavity 550, so that each sampling cavity 550 may be communicated with the inside of the cylinder 520 via the corresponding communication hole 501. The second blind tube 530 is coaxially sleeved in the cylinder 520 and is spaced from the cylinder by a certain distance, a closed end of the second blind tube faces the diffusion chamber 540, and an open end of the second blind tube 530 is in rotary sealing connection with the cylinder 520, so that an annular cavity 502 communicated with the diffusion chamber 540 is formed between the cylinder 520 and the second blind tube 530. A tube wall of the second blind tube 530 is provided with an open-loop sealing strip 503 corresponding to the communication hole 501 and a sampling hole 504 passing through the tube wall and the sealing strip 503, and the open end of the second blind tube 530 is communicated with the gas analyzer 310, so that the sample gas flowing in through the sampling hole 504 is sent to the gas analyzer 310 for component analysis. When the second blind tube 530 is rotated along the same direction to rotate relative to the cylinder 520, the communication hole 501 is in three states, namely diffusion state, sampling state and isolation state. The diffusion state refers to a state where the communication hole 501 faces the opening of the sealing strip 503, in this case, the sampling cavity 550 corresponding to the communication hole 501 is communicated with the annular cavity 502 and further communicated with the diffusion chamber 540 into a whole, the gas in the sampling cavity 550 participates in the gas diffusion process of the rock sample, and the gas components may change along with the diffusion. The sampling state refers to a state where the communication hole 501 faces the sampling hole 504, in this case, the sampling cavity 550 corresponding to the communication hole 501 is communicated with the second blind tube 530, so that the gas in the sampling cavity 550 may be conveyed to the gas analyzer 310 for component analysis. The gas component does not change in the sampling process because the gas is separated from the diffusion chamber 540, and meanwhile, the pressure of the diffusion chamber 540 cannot be influenced by the reduction of the gas in the sampling cavity 550, so that undisturbed sampling is achieved. The isolation state refers to a state where the communication hole 501 faces the outer wall of the sealing strip 503, in this case, the communication hole 501 is sealed by the outer wall of the sealing strip 503, and the corresponding sampling cavity 550 is isolated, so that the pressure of the diffusion chamber 540 and the gas component in the second blind tube 530 are not interfered. According to the present invention, a plurality of sampling holes 504 are provided, the sampling holes 504 are staggered along a circumference, and communication holes 501 are communicated with the corresponding sampling holes 504 in sequence when the second blind tube 530 is rotated, so that gas in the sampling cavities 550 is sampled in sequence. Thus, the communication holes 501 that are not sampled are always in a diffusion state, and the communication holes 501 that have been sampled are always in an isolation state until all the sampling holes 504 are sampled. The gas source 400 is communicated with the diffusion chamber 540 for supplying gas to the diffusion chamber 540, and the pressure gauge 320 is used to determine the gas pressure in the diffusion chamber 540.

In some embodiments, the pressures in the two diffusion chambers 540 may be determined separately to determine whether the initial pressures in the two diffusion chambers are balanced. Since the pressure difference has a large influence on the result, in some embodiments, a high-precision pressure difference gauge 330 is provided to measure the pressure difference between the two diffusion chambers 540, so as to facilitate more accurate measurement of the pressure difference, as shown in FIG. 1.

In some embodiments, a vacuum pump 600 may be provided to evacuate the diffusion chamber 540 and the sampling cavity 550 to facilitate rapid evacuation of air from the diffusion system and reduce the time required for the experiment.

When the core holder is used, the open end of the first blind tube 510 needs to be fixed in the core holder 100, so that the first blind tube 510 may be integrally and detachably fixed in the core holder 100, and the first blind tube 510 and the sampling cavity 550 may be integrally formed and may be integrally and detachably fixed in the core holder 100. For example, as shown in FIG. 1, the integral structure of the first blind tube 510 and the sampling cavity 550 is put into the core holder 100, and the integral structure is fixed in the core holder 100 by using a hollow plug 900 in threaded connection with the core holder 100.

In the present invention, the initial gas compositions in the two diffusion chambers 540 are different. In some embodiments, as shown in FIG. 1, the two diffusion chambers are connected to different gas sources 400. In other embodiments, as shown in FIG. 6, a plurality of gas sources 400 are connected in parallel and are communicated with the two diffusion chambers 540, so as to prepare the required gas components by adjusting the flow rates of the gas sources 400.

In some embodiments, the gas may be supplied into the diffusion chamber 540 by the pressure of the gas source 400. In other embodiments, the gas may be supplied into the diffusion chamber 540 by an intermediate container 700 with a piston, as shown in FIG. 6, two intermediate containers 700 share a displacement pump 800, and the displacement pump 800 injects a liquid into the intermediate container 700 to drive the piston in the intermediate container 700 to move, thereby pressing the gas at the other end of the intermediate container 700 into the diffusion chamber 540.

In some embodiments, an elastic layer is provided on an outer wall of the sealing strip 503, and the sampling hole 504 passes through the elastic layer to enhance the sealing performance.

Figure 6:
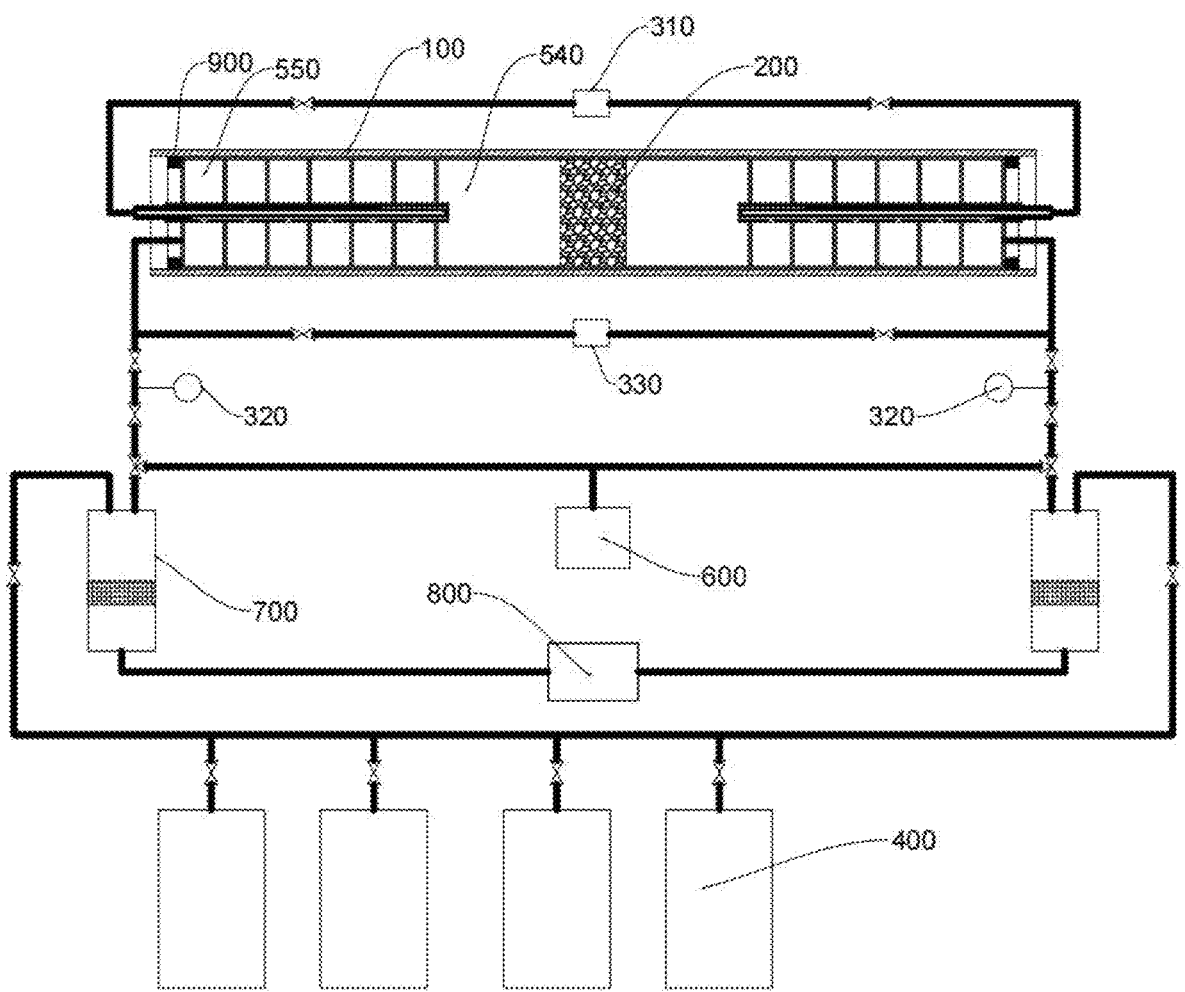
FIG. 6 is a schematic diagram of an overall structure of another embodiment of the present invention.

In some embodiments, as shown in FIG. 6, the gas source 400 is communicated with a sampling cavity 550, so that the gas is sent into the diffusion chamber 540 by the sampling cavity 550. In other embodiments, as shown in FIG. 2, a gas inlet hole 505 is provided at one side of the second blind tube 530 outside the sampling cavity 550, one end of the gas inlet hole 505 is communicated with the annular cavity 502, and the other end of the gas inlet hole is communicated with the gas source 400. In this way, as long as the volumes of the sampling cavities 550 are equal, the reduction in the volume of the diffused gas is equal every sampling, which facilitates the calculation of the entire volume of gas involved in the diffusion of the rock sample gas.

In some embodiments, temperature controllers may be provided at two sides of the core holder 100 to independently control the temperatures of the two diffusion chambers 540. When the temperatures of the two diffusion chambers 540 are controlled to be different, the gas diffusion coefficients under the conditions of temperature gradients and concentration gradients may be simulated.

The determination device of the present invention may determine gas diffusion coefficient in rocks by adopting the following method:
  S1. adjusting the communication holes 501 to face an opening of the sealing strip 503 by a connecting device, and then performing airtightness and replacement;
  S2. filling target gas into the sampling cavities 550 and the diffusion chambers 540, and cutting off the gas source 400 after adjusting pressures of the two diffusion chambers 540 to be equal; and
  S3. starting testing, rotating the second blind tube after a certain time interval to separate a single sampling cavity from the diffusion chamber, then sampling and analyzing gas components, and further calculating diffusion coefficient of the gas.

In step S3, the gas diffusion coefficient calculation formula in SY/T6129-2016 "Determination Method for Diffusion Coefficient of Hydrocarbon Gas in Rocks" may be used to determine the gas diffusion coefficient in the diffusion process corresponding to two adjacent samplings. When the number of samplings is large, a gas diffusion coefficient may be calculated for each of the two adjacent sampling processes, and then the average value of all gas diffusion coefficients is taken as the final gas diffusion coefficient.

For those skilled in the art, various other corresponding changes and deformations may be made according to the technical solutions and concepts described above, and all of these changes and deformations should fall within the protection scope of the claims of the present invention.

What is claimed is:
1. A device for determining gas diffusion coefficient in rocks, comprising:
  a core holder for holding a rock sample in a middle;
  two sampling mechanisms respectively arranged at two ends of the rock sample, comprising:
  a first blind tube having an open end facing the rock sample and in sealing connection with an end surface of the rock sample to form a diffusion chamber;
  at least two closed sampling cavities;
  a cylinder having one end sequentially passing through the sampling cavities and extending into the diffusion chamber, wherein a cylinder wall of the cylinder is provided with a communication hole corresponding to each of the sampling cavities;

a second blind tube coaxially sleeved in the cylinder and spaced a certain distance from the cylinder, wherein the second blind tube has a closed end facing the diffusion chamber and an open end in rotary sealing connection with the cylinder, so that an annular cavity communicated with the diffusion chamber is formed between the cylinder and the second blind tube; an outer wall of the second blind tube is provided with an open-loop sealing strip corresponding to the communication hole and a sampling hole passing through a tube wall and the sealing strip; when the second blind tube rotates relative to the cylinder, the communication hole is sequentially switched in the order of diffusion state, sampling state and isolation state, wherein the diffusion state refers to a state where the communication hole faces an opening of the sealing strip, the sampling state refers to a state where the communication hole is communicated with the sampling hole, and the isolation state refers to a state where the communication hole faces an outer wall of the sealing strip and is closed; the sampling holes are staggered along a circumference, so that the communication holes are sequentially communicated with the corresponding sampling holes when the second blind tube is rotated for sampling;

a gas analyzer communicated with the open end of the second blind tube;

a gas source communicated with the diffusion chamber; and a pressure gauge used to determine a pressure in the diffusion chamber.

2. The device for determining gas diffusion coefficient in rocks according to claim 1, further comprising a vacuum pump for evacuating the diffusion chamber and the sampling cavities.

3. The device for determining gas diffusion coefficient in rocks according to claim 1, further comprising a differential pressure gauge for measuring a pressure difference between the two diffusion chambers.

4. The device for determining gas diffusion coefficient in rocks according to claim 1, wherein the gas source is communicated with the sampling cavity.

5. The device for determining gas diffusion coefficient in rocks according to claim 1, wherein a gas inlet hole is provided at one side of the second blind tube outside the sampling cavity, one end of the gas inlet hole is communicated with the annular cavity, and the other end of the gas inlet hole is communicated with the gas source.

6. The device for determining gas diffusion coefficient in rocks according to claim 1, wherein an elastic layer is provided on an outer wall of the sealing strip, and the sampling hole passes through the elastic layer.

7. The device for determining gas diffusion coefficient in rocks according to claim 1, wherein temperature controllers are provided at two sides of the core holder to independently control temperatures of the two diffusion chambers.

8. The device for determining gas diffusion coefficient in rocks according to claim 1, wherein a plurality of the gas source are provided, the plurality of gas sources are connected in parallel and then communicated with two intermediate containers, the two intermediate containers are respectively communicated with the two diffusion chambers, each of the intermediate containers is provided with a piston, and a displacement pump is communicated with the two intermediate containers and is used to push the pistons to move in the intermediate containers so as to send gas into the diffusion chambers.

9. A method for determining gas diffusion coefficient in rocks, adopting the device for determining gas diffusion coefficient in rocks according to claim 1, comprising the following steps:

S1. adjusting the communication holes to face an opening of the sealing strip by a connecting device, and then performing airtightness and replacement;

S2. filling target gas into the sampling cavities and the diffusion chambers, and cutting off the gas source after adjusting pressures of the two diffusion chambers to be equal; and S3. starting testing, rotating the second blind tube after a certain time interval to separate a single sampling cavity from the diffusion chamber, then sampling and analyzing gas components, and further calculating diffusion coefficient of the gas.

\* \* \* \* \*